United States Patent

Rifkin et al.

[11] 3,727,835
[45] Apr. 17, 1973

[54] CEILING AIR TERMINAL

[75] Inventors: Ernest Rifkin, Dewitt; William E. Clark, Syracuse, both of N.Y.

[73] Assignee: Carrier Corporation, Syracuse, N.Y.

[22] Filed: July 1, 1971

[21] Appl. No.: 158,820

[52] U.S. Cl. ..................236/49, 236/87, 251/285
[51] Int. Cl. ..............................................F24f 7/00
[58] Field of Search...................236/49, 86, 87, 101; 251/11, 285

[56] References Cited

UNITED STATES PATENTS

| 851,385 | 4/1907 | Stuart | 236/87 X |
|---|---|---|---|
| 2,210,922 | 8/1940 | Joestring | 236/101 |
| 2,950,866 | 8/1960 | Scholz | 236/87 |
| 3,595,475 | 7/1971 | Morton | 236/101 X |

Primary Examiner—William F. O'Dea
Assistant Examiner—Peter D. Ferguson
Attorney—Harry G. Martin, Jr. et al.

[57] ABSTRACT

A ceiling air terminal serving as part of an air conditioning system for a building adapted to discharge conditioned air into an area to be treated. The terminal is provided with a bleed-type thermostat employing a bimetallic element movable in response to temperature variations in the air passing over the element from the area served by the air terminal. The bimetallic element regulates the quantity of air bled from the thermostat to thereby control the quantity of conditioned air discharged from the terminal. The thermostat includes a stop member associated with said bimetallic element to prevent any movement of said element beyond a predetermined distance.

1 Claim, 2 Drawing Figures

INVENTOR.
ERNEST RIFKIN
WILLIAM E. CLARK
BY
ATTORNEY

INVENTOR.
ERNEST RIFKIN
BY WILLIAM E. CLARK
ATTORNEY

CEILING AIR TERMINAL

BACKGROUND OF THE INVENTION

The use of thermoplastics, such as acetals instead of metals, has become quite prevalent in recent years, due to the relative, inexpensive cost of such thermoplastics. The utilization of such plastics has permitted manufacturers to decrease the cost of their products without creating a concomitant decrease in performance. Acetal thermoplastics have been found to be particularly suitable for many applications formerly requiring metals such as zinc, brass, and aluminum.

There are two types of acetal thermoplastics commonly in use. One is a homopolymer essentially formed of a straight formaldehyde chain. The other acetal thermoplastic is a copolymer, essentially formed of a trioxane chain, sold and manufactured by the Celanese Corporation under the trade mark "Celcon."

Acetal thermoplastics have been used quite extensively in the manufacture of thermostats of the type disclosed in copending application, Ser. No. 846,662, now U.S. Pat. No. 3,595,475 filed Aug. 1, 1969, Daniel H. Morton, inventor. The thermostat disclosed in the aforecited copending application has proven to be highly satisfactory when employed to regulate the operation of ceiling air conditioning terminals of the type utilizing a portion of the conditioned air supplied thereto as a control medium, to avoid the necessity of a separate control system.

To minimize installation costs, it has been the practice to calibrate such thermostats at the point of manufacture, prior to shipment to the installation site. However, it has been found, subsequent to shipping to such installation site, some of the thermostats, although properly calibrated at their manufacturing point, did not retain their calibration after shipping. The recalibration of the thermostats requiring same necessitated a time consuming and expensive operation.

A primary reason for the loss of calibration is due to excessive temperatures the thermostats are subjected to during shipping. The excessive shipping temperatures has caused some of the acetal thermoplastic parts to "cold flow" or "creep," which results in the particular plastic part becoming permanently deformed.

It is therefore an object of this invention to prevent "cold flowing" of thermoplastic parts when they are subjected to excessive shipping temperature.

SUMMARY OF THE INVENTION

This invention relates to a ceiling air terminal serving as part of an air conditioning system for a building adapted to discharge conditioned air into an area to be treated. In particular, this invention relates to a thermostat employed with such air terminal, adaptable to regulate the quantity of air discharged from the terminal in response to variations in the temperature of the air in the area being served thereby.

The thermostat is a bleed type employing a bimetallic element movable in response to the variations in the ambient temperature. The bimetallic element is mounted on an adjustable support member disposed in a housing.

A sliding plate regulates the discharge of air through the bleed port of the thermostat. One end of the U-shaped bimetallic element is affixed to the adjustable support member; the other end is associated with means for moving the sliding plate to selectively close or open the bleed ports, to modulate the bleeding of air from the thermostat.

The last mentioned means includes a member formed from a thermoplastic material. A stop member prevents any movement of the bimetallic element beyond a predetermined distance so as to prevent the sliding plate from coming into direct contact with the housing. By maintaining a minimum clearance between the housing and sliding plate, even when the thermostat is subjected to excessively high temperatures, no undue stress will occur in the thermoplastic member and the member will maintain its original configuration.

DESCRIPTION OF THE PREFERRED EMBODIMENT

Figure 1:
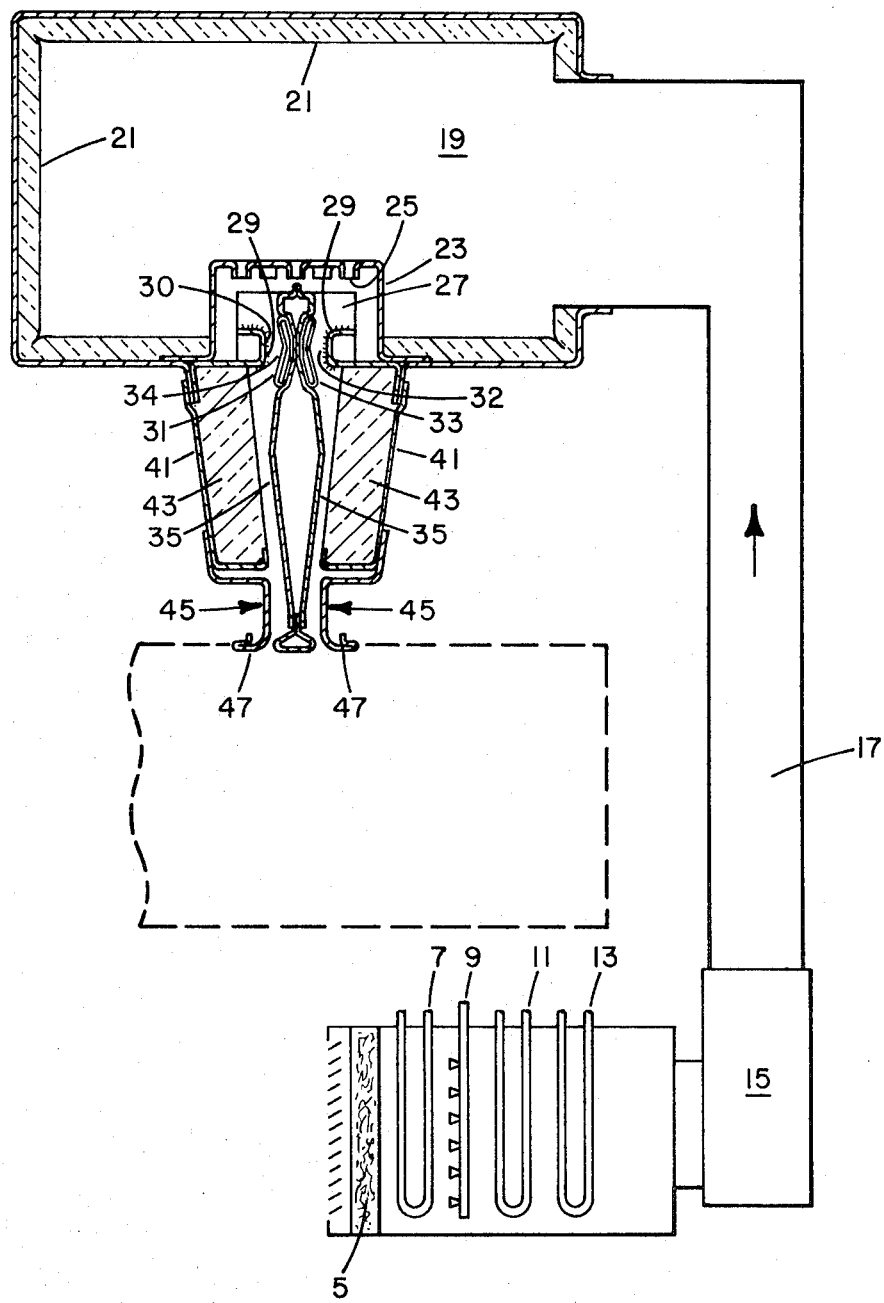
FIG. 1 is a schematic of a portion of an air conditioning system illustrating an air terminal employing the thermostat of the present invention.

Referring to the drawings, there is illustrated a central air conditioning apparatus of the type employed in large multi-story buildings including a system of duct work, a filter 5, a cooling coil 7, spray means 9, a cooling coil 11, a heating coil 13, and a fan 15 for heating, cooling, humidifying and filtering the air as desired to provide conditioned air for passage to the areas for use in the building equipped with an air conditioning system incorporating the apparatus.

A supply air duct 17 is illustrative of the plurality of ducts provided to supply conditioned air to ceiling air terminals disposed in areas throughout the building. The ceiling terminal includes a primary chamber 19 lined with a sound absorbing material 21 such as a glass-fiber blanket. The primary chamber is ordinarily open at both ends for connecting a series of terminals end to end to provide a complete air discharge system. Suitable end pieces, not shown, are utilized to cap the end terminals in the series. An air supply distribution plate 23 having a plurality of collared openings 25 therein is provided to evenly distribute the supply of air from primary chamber 19 into a distribution chamber 27 which is defined by the top and side walls of distribution plate 23.

The bottom of distribution chamber 27 includes aligned cut-off plates 29 which are provided with a curved surface 30 for engagement by bladders 31 and 33 of an air flow control unit to form a damper. The curved surfaces smooth the flow of air through the damper to minimize the pressure drop therethrough and to minimize noise generation within the terminal. The surface 30 is covered with felt 32 to further minimize noise. By varying the inflation of the bladders, the area of the openings between the bladders and the cut-off plates may be varied to regulate the quantity of air discharged into the area being conditioned.

Bladders 31 and 33 are adhesively mounted on a central partition comprised of opposed, generally convex plates 35. The plates have a "V" shaped recess therein so the bladders are completely recessed within the plates when deflated. This provides a large area between active walls 34 of the bladders and the cut-off plates for maximum air flow therebetween. Further, the recessed bladder provides a smooth surface along plate 35 to minimize air turbulence.

The damper mechanism is disposed a substantial distance upstream from the discharge openings in the terminal to provide sufficient space therebetween to absorb any noise generated by the damper mechanism. For maximum sound absorption, downwardly extending walls 41 which form narrow, vertical air discharge passages in conjunction with plates 35 are lined with a sound absorbing material such as glass-fiber blankets 43. Outlet members 45 having outwardly flared lower portions 47 thereon are affixed by welding to walls 41.

The ceiling terminal disclosed hereinabove may be utilized to provide a variety of modes of terminal operation. If it is desired to maintain a constant discharge of air from the terminal, a pressure responsive control may be employed to inflate the bladders in response to supply air pressure to reduce the area between the bladders and cut-off plates as duct pressure increases and to increase the area therebetween as duct pressure decreases.

If it is desired to control the terminal to provide a constant room temperature under varying cooling loads, the bladder inflation may be controlled by a thermostat responsive to room temperature to provide an increased quantity of air flow from the terminal as the cooling load increases and a decreased quantity of air flow from the terminal as the cooling load decreases.

Figure 2:
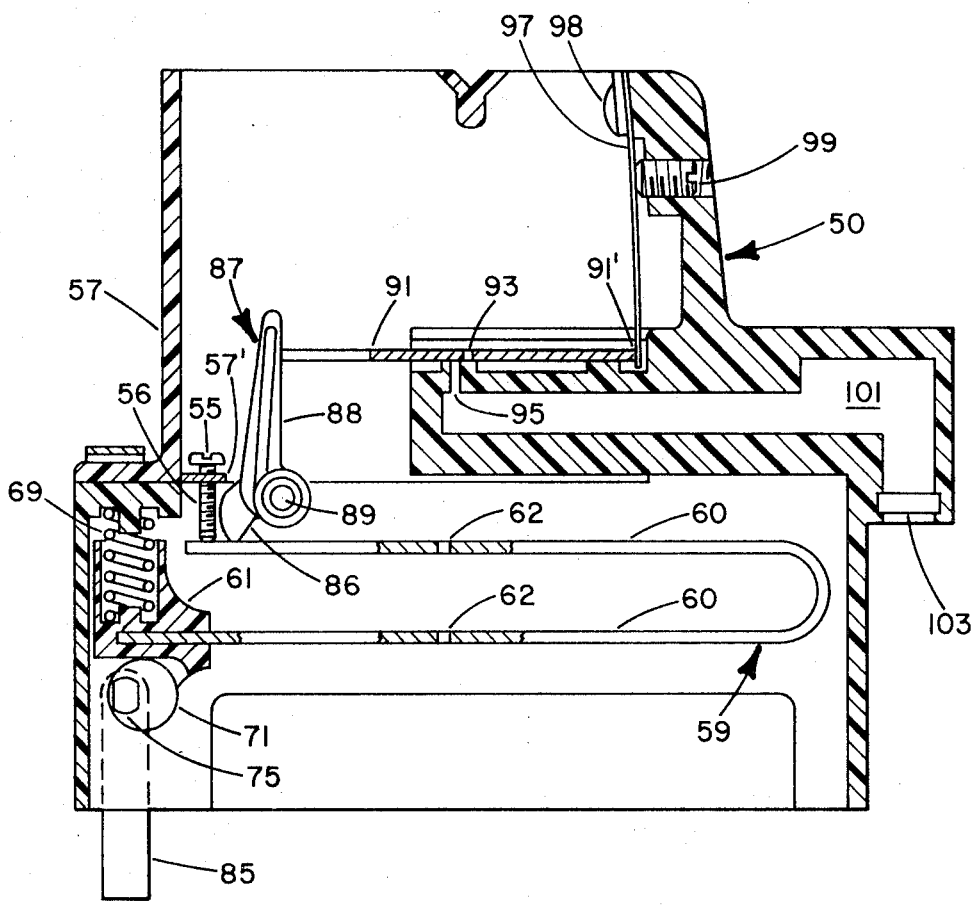
FIG. 2 is a cross-sectional view of the bleed-type thermostat of the present invention.

A cross-sectional view of a thermostat which has proven to be highly satisfactory in regulating the operation of the ceiling air terminal disclosed hereinabove is shown in FIG. 2. Thermostat 50 includes a housing 57 having an opening formed in the lower portion thereof for passage of room air therethrough into the interior of the housing. A "U" shaped bimetallic element 59 is mounted within housing 57 on an adjustment block 61. In order to assure maximum contact of room air with the bimetallic element and to provide a bimetallic element large enough to actuate the movable members of the thermostat, bimetallic element 59 is preferably provided with a plurality of perforations 62 extending throughout its axial length in both legs 60 thereof. By preferably forming the perforations in legs 60 of the bimetallic element, an element having a width slightly less than the interior of housing 57 may be employed. The perforations in element 59 allow maximum contact between room air and element 59 for rapid and accurate response of the thermostat to variations in room temperature.

The adjustment block which mounts bimetallic element 59 is slidably mounted within housing 57 for vertical movement relative thereto. Springs 69 are provided to bias block 61 against temperature adjustment cams 71 formed on adjustment shaft 75. Shaft 75 is journalled in a calibration block which is secured to housing 57 by a calibration screw (not shown). The position of the calibration block may be adjusted relative to the housing by the calibration screw. A more detailed explanation of the thermostat may be found in copending application Ser. No. 846,662, filed Aug. 1, 1969, now U.S. Pat. No. 3,595,475 in the name of Daniel H. Morton. A rotational force may be applied manually or otherwise to shaft 75 via adjustment lever 85 which is affixed to the end thereof.

A lever 87 pivotable about a shaft 89, journalled within the side walls of housing 57, is provided to convert the vertical movement of the bimetallic element caused by temperature variations into horizontal movement. A bleed plate 91 having an opening 93 therein is provided to override bleed port 95 formed within housing 57. To obtain an extremely compact thermostat a very short bimetallic element is utilized. Lever 87 is therefore provided with arms 86 and 88 of unequal lengths measured from pivot 89. The short arm contacts bimetallic element 59 while the long arm contacts bleed plate 91. This provides a relatively large horizontal movement of the bleed plate to compensate for the relatively small vertical movement resulting from the use of a short bimetallic element. To obtain the necessary force against arm 86, bimetallic element 59 has a greater thickness than bimetallic elements normally employed in a thermostat of this type.

A leaf spring 97 suitably affixed to housing 57, by means such as fastener 98, is provided to bias plate 91 toward lever 87. An adjustment screw 99 in housing 57 is provided to adjust the biasing force exerted by spring 97 against plate 91.

Bleed port 95 communicates with an air passage 101 within housing 57. An opening 103 within housing 57, communicating with passage 101, is provided for receiving a suitable pressure regulator to provide regulated control pressure to thermostat bleed port 95. For a description of a suitable pressure regulator, reference may be had to U.S. Pat. No. 3,434,409, granted March 25, 1969 in the name of Daniel A. Fragnito. Air is bled from the regulator through bleed port 95 to provide variable air pressure at bladders 31 in response to temperature variations in the area being treated. To minimize installation costs, the thermostat is preferably factory calibrated in the manner disclosed in the heretofore cited copending application.

To further reduce costs, many of the parts of the thermostat are formed from a thermoplastic material such as acetal of the types heretofore mentioned. In particular, lever 87 is formed from such a thermoplastic. As noted hereinbefore, arm 86 is in contact with element 59 and arm 88 is in contact with plate 91; thus each of the arms of the lever are in contact with metal components.

It has been found, during the shipping of the thermostats from the factory to their place of installation, some of the thermostats have been subjected to excessively high temperatures. When subjected to such temperatures, bimetallic element 59 moves upwardly, rotating lever 87 in a clockwise direction, thereby moving plate 91 towards the right as viewed in FIG. 2. The maximum flow of conditioned air from the terminal is obtained when port 93 of plate 91 is in direct alignment with bleed port 95 of the thermostat.

If the thermostat is subjected to excessively high temperatures, such as may occur during shipping, it has heretofore been possible for sliding plate 91 to move so end 91' has come into direct contact with housing 57, thereby preventing any further horizontal movement of the plate. If the bimetallic element were to still be exposed to a temperature which would normally further rotate lever 87 so as to move plate 91 further toward the right, the lever would thus be subjected to a severe stress created by the inability of plate 91 to move in the manner required. Arms 86 and 88 will each be compressed by remaining in contact with their respective metal parts. The stress thus introduced will cause thermoplastic lever 87 to "creep" or "cold flow." When this "creep" has occurred, the thermostats, in some cases, would then be miscalibrated, thus requiring recalibration at the installation site, or a return to the factory, for recalibration thereat which in either case would be both time consuming and costly.

To prevent the overstressing of lever 87 and the resultant miscalibration of the thermostat, stop means 55 is incorporated in the thermostat. Preferably stop means 55 includes an adjustable member, such as screw 56, which is positioned within an extension 57' of housing 57. Screw 56 overlies the free end of bimetallic element 59. As shown in FIG. 2, sliding plate 91 has moved toward the right due to the sensing of a high temperature so port 93 has traveled beyond alignment with port 95. Further rightward travel would cause plate 91 to come into contact with housing 57. However, stop means 55 prevents the bimetal from moving any further in an upward vertical direction. This prevents any further rotation of lever 87, which in turn prevents any further movement of plate 91 towards housing 57. By eliminating any actual physical contact between plate 91 and housing 57, lever 87 will not be overstressed, even upon the occurrence of the excessively high temperatures sometimes encountered during shipping.

After the thermostat has been calibrated at the factory, stop means 55 is adjusted so as to prevent any upward movement of bimetallic element 50 beyond a predetermined distance so as to maintain a minimal clearance between end 91' of plate 91 and the housing.

By providing stop means in accordance with our invention, a thermostat is provided that will maintain its calibration even when subjected to excessively high temperatures.

While we have described and illustrated a preferred embodiment of our invention, our invention should not be limited thereto, but may be otherwise embodied within the scope of the following claims.

We claim:

1. In combination with a ceiling air terminal operable to discharge conditioned air into an area, a bleed-type thermostat comprising:
   A. means defining a housing;
   B. means forming a bleed port associated with such housing;
   C. a plate slidably disposed in said housing and movable in a horizontal plane therethrough, said plate being operable to regulate the flow of air through said bleed port;
   D. adjustable support means mounted on said housing means;
   E. a bimetallic element having one end affixed to said adjustable support means for adjusting the location of said bimetallic element relative to said housing;
   F. means associated with the other end of said bimetallic element for moving said plate in response to movement of said other end of said bimetallic element, said last mentioned means including a member formed from a thermoplastic material, said thermoplastic member being in direct contact with said plate and said bimetallic element, passage of ambient air over said bimetallic element causing movement thereof in response to temperature variations to regulate the flow of air through said bleed port;
   G. means to provide a biasing force on said plate in opposition to the force supplied thereon by said bimetallic element responsive means; and
   H. stop means associated with said bimetallic element to prevent movement thereof beyond a predetermined distance, to maintain a minimum clearance between an edge of said plate and said housing, to thereby prevent said thermoplastic member from being deformed as a result of excessive stress thereon.

* * * * *